United States Patent
Itazuri (10) Patent No.: US 12,263,838 B2
(45) Date of Patent: Apr. 1, 2025

(54) LANE DEPARTURE SUPPRESSION DEVICE

(71) Applicant: TOYOTA JIDOSHA KABUSHIKI KAISHA, Toyota (JP)

(72) Inventor: Kazuki Itazuri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 17/877,038

(22) Filed: Jul. 29, 2022

(65) Prior Publication Data

US 2023/0055183 A1 Feb. 23, 2023

(30) Foreign Application Priority Data

Aug. 17, 2021 (JP) .................................. 2021-132940

(51) Int. Cl.
*B60W 30/12* (2020.01)
*B60W 50/14* (2020.01)

(52) U.S. Cl.
CPC ............ *B60W 30/12* (2013.01); *B60W 50/14* (2013.01); *B60W 2520/12* (2013.01); *B60W 2520/125* (2013.01); *B60W 2540/10* (2013.01); *B60W 2552/10* (2020.02); *B60W 2710/20* (2013.01); *B60W 2720/106* (2013.01)

(58) Field of Classification Search
CPC .. B60W 30/12; B60W 50/14; B60W 2520/12; B60W 2520/125; B60W 2552/20; B60T 2201/08; B60T 2201/089; B60T 8/17557
See application file for complete search history.

(56) References Cited

U.S. PATENT DOCUMENTS

| 2012/0140039 A1* | 6/2012 | Ota ........................ B60W 30/12 |
| | | 348/148 |
| 2018/0105152 A1* | 4/2018 | Nagae .................... G08G 1/165 |
| 2018/0345967 A1 | 12/2018 | Oniwa |
| 2019/0084619 A1 | 3/2019 | Mizoguchi |
| 2020/0023899 A1* | 1/2020 | Takahashi ............. B62D 6/008 |
| 2021/0362720 A1 | 11/2021 | Takahashi et al. |
| 2022/0105983 A1* | 4/2022 | Omikawa ............ B62D 15/025 |
| 2022/0204082 A1 | 6/2022 | Fukutomi |

FOREIGN PATENT DOCUMENTS

| JP | 2005-018211 A | 1/2005 |
| JP | 2009-35213 A | 2/2009 |
| JP | 2009-116693 A | 5/2009 |
| JP | 2010006271 A | 1/2010 |

(Continued)

*Primary Examiner* — Kenneth J Malkowski
(74) *Attorney, Agent, or Firm* — Sughrue Mion, PLLC (57) ABSTRACT

A lane departure suppression device including a control unit that executes a lane departure suppression control (automatic steering of the steering wheel and/or a warning being issued) when it is determined that there is a possibility that a vehicle departs from a lane. The control unit does not execute the lane departure suppression control when the control unit determines that a lateral speed and a lateral acceleration of the vehicle are increased within a predetermined time from a time point at which acceleration and deceleration of the vehicle is started, and that there is an adjacent lane on a side with respect to the lane in which the lateral speed and the lateral acceleration are increased.

3 Claims, 8 Drawing Sheets

(56) References Cited

FOREIGN PATENT DOCUMENTS

| JP | 2012-108653 A | 6/2012 |
| JP | 2015-115040 A | 6/2015 |
| JP | 2015-217852 A | 12/2015 |
| JP | 2018-203006 A | 12/2018 |
| JP | 2019-51837 A | 4/2019 |
| JP | 2019-85048 A | 6/2019 |
| JP | 2019-177762 A | 10/2019 |
| JP | 2022-102746 A | 7/2022 |

* cited by examiner

LANE DEPARTURE SUPPRESSION DEVICE

CROSS-REFERENCE TO RELATED APPLICATION

This application claims priority to Japanese Patent Application No. 2021-132940 filed on Aug. 17, 2021, incorporated herein by reference in its entirety.

BACKGROUND

1. Technical Field

The present disclosure relates to a lane departure suppression device for a vehicle such as an automobile.

2. Description of Related Art

A lane departure suppression device detects the position of a vehicle with respect to a lane with a vehicle position detection device, and executes a lane departure suppression control of at least one of automatic steering of a steering wheel and issuing of a warning, when it is determined that there is a possibility that the vehicle departs from the lane based on the detected position of the vehicle.

In the lane departure suppression device, when the driver intends to depart from the lane such as changing lanes based on his or her own will, the lane departure suppression control needs to be restricted. For example, in the following Japanese Unexamined Patent Application Publication No. 2019-177762 (JP 2019-177762 A), it is stated that even when it is determined that there is a possibility that a vehicle departs from the lane, a lane departure suppression control is restricted when a steering torque detected by a steering torque sensor is equal to or higher than the reference value.

According to the lane departure suppression device such as the lane departure suppression device described in JP 2019-177762 A, the lane departure suppression control is restricted when a driver tries to depart from the lane based on his or her own intention. Thus, it is possible to reduce the possibility that the driver feels annoyed due to the automatic steering of the steering wheel and a warning being issued.

SUMMARY

Even when the vehicle travels in a merging area or a branch area of the road, the driver tries to depart from the lane based on his or her own will. However, when the merging area or the branching area is the merging area or the branching area of an expressway or a motorway, the steering operation amount by the driver does not increase. Thus, even in a lane departure suppression device such as the lane departure suppression device described in JP 2019-177762 A, the lane departure suppression control is not restricted, and the driver feels annoyed due to the automatic steering of the steering wheel and a warning being issued.

The main object of the present disclosure is to provide an improved lane departure suppression device in which even when a vehicle travels in a merging area or a branching area of a road, the lane departure suppression control is restricted and a driver is suppressed from feeling annoyed due to automatic steering of a steering wheel and a warning being issued.

According to the present disclosure, provided is a lane departure suppression device (100) includes:
a vehicle position detection device (camera sensor 12) that detects a position of a vehicle (50) with respect to a lane (54); and a control unit (LDA/ECU 10) that executes a lane departure suppression control that is at least one of automatically steering a steering wheel and issuing a warning (S60) when the control unit determines that there is a possibility that the vehicle departs from the lane based on the position of the vehicle detected by the vehicle position detection device (S40).

The control unit (LDA/ECU 10) does not execute the lane departure suppression control (S20, S30, S170, S270) when the control unit determines that a lateral speed and a lateral acceleration of the vehicle with respect to the lane in which the vehicle is traveling are increased within a predetermined time from a time point at which acceleration and deceleration of the vehicle is started, and that there is an adjacent lane on a side with respect to the lane in a direction in which the lateral speed and the lateral acceleration of the vehicle are increased (S150, S160, S250, S260).

Generally, when a vehicle travels in a merging area of a road, the vehicle accelerates on a branch road and moves in a lateral direction from the branch road to a side of a main road while moving forward. Thus, there is an adjacent lane of the main road on a side of the lateral direction in which the vehicle moves. When the vehicle travels in a branching area of the road, the vehicle decelerates on the branch road and moves in the lateral direction from the main road to a side of a branch road while moving forward. Thus, there is an adjacent lane of the branch road on a side of the lateral direction in which the vehicle moves.

According to the configuration described above, the control unit does not execute the lane departure suppression control when the control unit determines that a lateral speed and a lateral acceleration of the vehicle with respect to the lane in which the vehicle is traveling are increased within a predetermined time from a time point at which acceleration and deceleration of the vehicle is started, and that there is an adjacent lane on a side with respect to the lane in a direction in which the lateral speed and the lateral acceleration of the vehicle are increased. When the vehicle travels in the merging area and when the vehicle travels in the branching area, since the lane departure prevention control is not executed, it is possible to suppress the driver from feeling annoyed by the automatic steering of the steering wheel and by an alarm being issued.

In one aspect of the present disclosure, the control unit (LDA/ECU 10) does not determine whether there is a possibility that the vehicle departs from the lane (S20, S30) when the control unit determines that the lateral speed and the lateral acceleration of the vehicle with respect to the lane in which the vehicle is traveling are increased within a predetermined time from a time point at which acceleration and deceleration of the vehicle is started, and that there is the adjacent lane on the side with respect to the lane in the direction in which the lateral speed and the lateral acceleration of the vehicle are increased (S150, S160, S250, S260).

According the aspect described above, the determination of whether there is a possibility that the vehicle departs from the lane is not performed, when the control unit determines that the lateral speed and the lateral acceleration of the vehicle with respect to the lane in which the vehicle is traveling are increased within the predetermined time from the time point at which acceleration and deceleration of the vehicle is started, and that there is the adjacent lane on the side with respect to the lane in the direction in which the lateral speed and the lateral acceleration of the vehicle are increased. Thus, in a situation where the vehicle travels in the merging area or the branch area of the road and the lane departure suppression control is not executed, it is possible to suppress unnecessarily determining whether there is a possibility that the vehicle departs from the lane.

In one aspect of the present disclosure, the control unit (LDA/ECU 10) does not execute the lane departure suppression control (S20, S170) when the control unit determines that the lateral speed and the lateral acceleration of the vehicle with respect to the lane in which the vehicle is traveling are increased within a first predetermined time from a time point at which acceleration of the vehicle is started by a driver, that there is the adjacent lane on the side with respect to the lane in the direction in which the lateral speed and the lateral acceleration of the vehicle are increased, and that a width of the lane is decreased (S150, S160).

According to the aspect described above, the lane departure suppression control is not executed when the control unit determines that the lateral speed and the lateral acceleration of the vehicle with respect to the lane in which the vehicle is traveling are increased within the first predetermined time from the time point at which acceleration of the vehicle is started by the driver, that there is the adjacent lane on the side with respect to the lane in the direction in which the lateral speed and the lateral acceleration of the vehicle are increased, and that the width of the lane is decreased. Therefore, it is possible to suppress the lane departure suppression control from being executed in a situation where the vehicle travels in the merging area of the road.

In another one aspect of the present disclosure, the control unit (LDA/ECU 10) does not execute the lane departure suppression control (S20, S270) when the control unit determines that the lateral speed and the lateral acceleration of the vehicle with respect to the lane in which the vehicle is traveling are increased within a second predetermined time from a time point at which deceleration of the vehicle is started by a driver, that there is the adjacent lane on the side with respect to the lane in the direction in which the lateral speed and the lateral acceleration of the vehicle are increased, and that a width of the adjacent lane is increased (S250, S260).

According to the aspect described above, the lane departure suppression control is not executed when the control unit determines that the lateral speed and the lateral acceleration of the vehicle with respect to the lane in which the vehicle is traveling are increased within the second predetermined time from the time point at which deceleration of the vehicle is started by the driver, that there is the adjacent lane on the side with respect to the lane in the direction in which the lateral speed and the lateral acceleration of the vehicle are increased, and that the width of the adjacent lane is increased. Therefore, it is possible to suppress the lane departure suppression control from being executed in a situation where the vehicle travels in the branch area of the road.

Further, in another one aspect of the present disclosure, the control unit (LDA/ECU 10) does not execute the lane departure suppression control until the control unit determines that a preset cancel condition is satisfied (S70, S80).

According to the aspect described above, the lane departure suppression control is not executed until it is determined that the preset cancel condition is satisfied. Thus, it is possible to suppress the lane departure suppression control from being executed unnecessarily early.

Further, according to another one aspect of the present disclosure, the control unit (LDA/ECU 10) determines that the cancel condition is satisfied when the control unit (LDA/ECU 10) determines that the vehicle has moved to the adjacent lane and determines that the lateral speed and the lateral acceleration of the vehicle with respect to the adjacent lane are equal to or less than a reference lateral speed and a reference lateral acceleration, respectively.

According to the aspect described above, the control unit determines that the cancel condition is satisfied when the control unit determines that the vehicle has moved to the adjacent lane and determines that the lateral speed and the lateral acceleration of the vehicle with respect to the adjacent lane are equal to or less than the reference lateral speed and the reference lateral acceleration, respectively. Thus, when the vehicle travels in the merging area of the road, the lane departure suppression control can be suppressed from being executed until the vehicle moves from the branch road to the main road and substantially travels along the lane of the main road. Further, when the vehicle travels in the branch area of the road, the lane departure suppression control can be suppressed from being executed until the vehicle moves from the main road to the branch road and substantially travels along the lane of the branch road.

In the above description, in order to help understanding of the present disclosure, the names and/or the reference signs used in the embodiment are added in parentheses to the configurations of the disclosure corresponding to the embodiment to be described later. However, each component of the present disclosure is not limited to the component of the embodiment corresponding to the name and/or the symbol attached in parentheses. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A lane departure suppression device according to an embodiment of the present disclosure will be described in detail with reference to the accompanying drawing.

Structure

Figure 1:
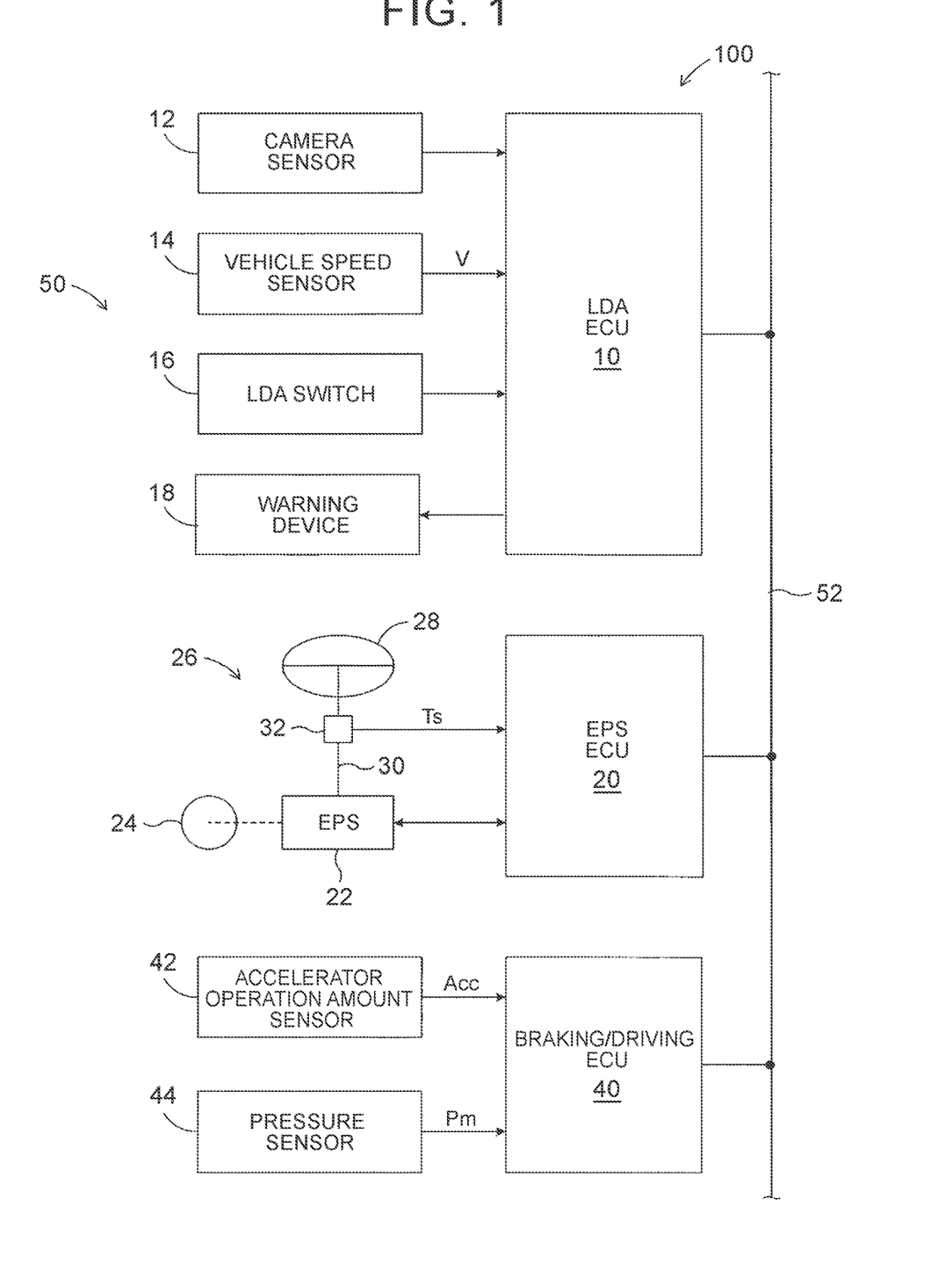
FIG. 1 is a schematic configuration diagram showing an embodiment of a lane departure suppression device according to the present disclosure.

As shown in FIG. 1, a lane departure suppression device 100 according to the embodiment is applied to a vehicle 50 and includes a lane departure suppression ECU 10, an electric power steering ECU 20, and a braking/driving ECU 40. In the present specification, lane departure suppression is referred to as an LDA (an abbreviation of a lane departure alert with control) as necessary, and electric power steering is referred to as an EPS (an abbreviation of an electric power steering) as necessary.

These ECUs are electric control units each including a microcomputer as a main unit, and are connected to each other so as to be able to transmit and receive information via a controller area network (CAN) 52. Each of the microcomputers include a central processing unit (CPU), a read-only memory (ROM), a random access memory (RAM), a non-volatile memory, and an interface (I/F), and the like. The CPU realizes various functions by executing instructions (programs, routines) stored in the ROM. Some or all of these ECUs may be integrated into one ECU.

As will be described in detail later, the ROM of the LDA/ECU 10 stores a lane departure suppression control program corresponding to the flowchart shown in FIG. 2, and the CPU executes the lane departure suppression control according to the program. A camera sensor 12, a vehicle speed sensor 14, an LDA switch 16, and a warning device 18 are connected to the LDA/ECU 10.

The camera sensor 12 includes a camera unit and a lane recognition unit that analyzes image data acquired by taking a picture with the camera unit and that recognizes a white line on a road. The camera sensor 12 (camera unit) captures the scenery ahead of the vehicle 50. The camera sensor 12 (lane recognition unit) repeatedly supplies information regarding the recognized white line to the LDA/ECU 10 every time a predetermined calculation cycle elapses.

Figure 7:
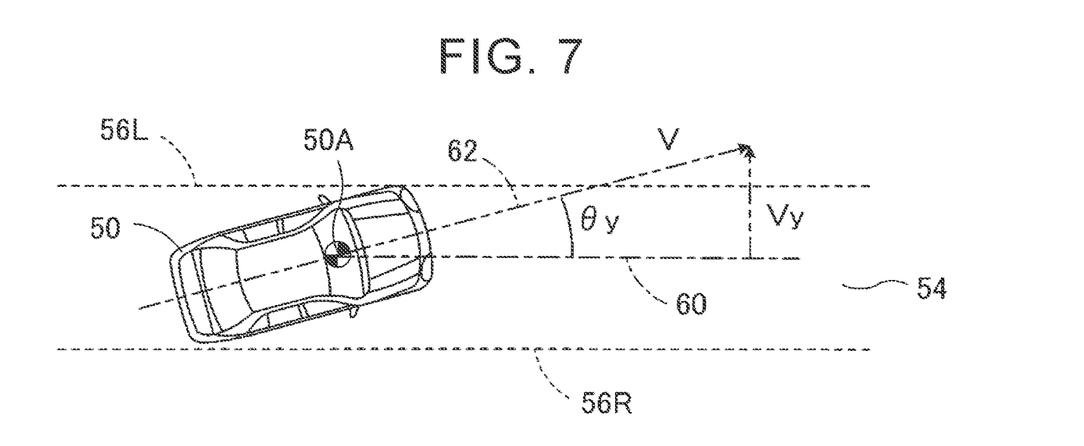
FIG. 7 is a diagram showing a situation in which the vehicle runs at an angle with respect to a longitudinal direction of a lane.

As shown in FIG. 7, the camera sensor 12 can recognize white lines 56L and 56R that are boundaries of a lane 54 (referred to as lane boundaries), and the camera sensor 12 can detect a relative positional relationship of the vehicle with respect to the lane 54, based on a relationship between a white line and a position of the vehicle 50. Here, the position of the vehicle 50 is a position of a center of gravity 50A of the vehicle, but it may be a center position in a plan view of the vehicle. A lateral position of the vehicle, which will be described later, represents the position of the center of gravity in a lane width direction, and a lateral speed of the vehicle represents a speed of the position of the center of gravity in the lane width direction. These are acquired based on the relative positional relationship between the white line detected by the camera sensor 12 and the vehicle.

The vehicle speed sensor 14 detects a vehicle speed V of the vehicle 50 and repeatedly supplies a signal indicating the vehicle speed V to the LDA/ECU 10 at a predetermined control cycle. The LDA switch 16 is operated by a driver and supplies a signal indicating whether it is on to the LDA/ECU 10. When the LDA switch 16 is on, it means that the lane departure suppression control is executed.

The warning device 18 is activated when the LDA/ECU 10 determines that there is a possibility that the vehicle 50 departs from the lane 54, and issues a warning as one of the lane departure suppression controls, that is, issues a warning that there is a possibility that the vehicle 50 departs from the lane. The warning device 18 may be any one of a warning device that issues a visual warning such as a warning lamp, a warning device that issues an auditory alarm such as a warning buzzer, and a warning device that issues a bodily sensing alarm such as vibration of a seat, or may be any a combination thereof.

By controlling an EPS device 22, the EPS/ECU 20 can steer a steering wheel 24 as needed. Thus, the EPS/ECU 20 and the EPS device 22 constitute a steering device 26 that automatically steers the steering wheel 24 as needed. When it is determined by the LDA/ECU 10 that there is a possibility that the vehicle 50 departs from the lane, the EPS/ECU 20 performs autonomous steer of the steering wheel 24 for suppressing the vehicle from deviating from the lane, as another one of lane departure suppression control.

As shown in FIG. 1, the steering shaft 30 to which a steering wheel 28 operated by the driver is integrally connected is provided with a torque sensor 32 that detects a steering torque Ts. The signal indicating the steering torque Ts detected by the torque sensor 32 is input to the EPS/ECU 20. Based on the steering torque Ts and the vehicle speed V detected by the vehicle speed sensor 14, the EPS/ECU 20 controls the steering assist torque by controlling the EPS device 22 in a manner known in the technical field, and reduces a steering load of the driver. The signal indicating the steering torque Ts is input from the EPS/ECU 20 to the LDA/ECU 10 via the CAN 52.

The braking/driving ECU 40 is connected to an accelerator operation amount sensor 42 that detects an accelerator operation amount Acc that changes when the accelerator pedal, which is not shown in the figure, is operated by the driver. Further, a pressure sensor 44 is connected to the braking/driving ECU 40. The pressure sensor 44 detects a master cylinder pressure Pm that changes when a brake pedal (not shown in the figure) is operated by the driver. Although not shown in FIG. 1, a driving device and a braking/driving device are connected to the braking/driving ECU 40. The driving device is an engine for example, which controls a driving force in accordance with the accelerator operation amount Acc, and the braking/driving device controls a braking force of wheels in accordance with the master cylinder pressure Pm.

The signals indicating the accelerator operation amount Acc and the master cylinder pressure Pm are input from the braking/driving ECU 40 to the LDA/ECU 10 via the CAN 52, as signals indicating the acceleration operation amount and the deceleration operation amount of the driver, respectively.

Lane Departure Suppression Control Routine

Next, a lane departure suppression control routine in the embodiment will be described with reference to the flowchart shown in FIG. 2. The lane departure suppression control according to the flowchart shown in FIG. 2 is repeatedly executed by the CPU of the LDA/ECU 10 at a predetermined control cycle when the LDA switch 16 shown in FIG. 1 is turned on. In the following description, the lane departure suppression control is simply referred to as the "control".

First, in step S10, the CPU determines whether a flag Foff is 1, that is, determines whether the lane departure suppression control based on the driver's intention of lane departure is not being executed. When the CPU makes the affirmative determination, the CPU advances the control to step S70, and when the CPU makes the negative determination, the CPU advances the control to step S20. The flag Foff is initialized to 0 at the start of control, and then set to 0 or 1 in accordance with the flowchart shown in FIG. 2 as described later.

In step S20, the CPU determines whether a flag Fma is 1, that is, determines whether the lane departure suppression control when traveling in a merging area of the road is not being executed. When the CPU makes the affirmative determination, the control is temporarily terminated, and when the CPU makes the negative determination, the CPU advances the control to step S30.

In step S30, the CPU determines whether the flag Fba is 1, that is, determines whether the lane departure suppression control when traveling in a branch area of the road is not being executed. When the CPU makes the affirmative determination, the control is temporarily terminated, and when CPU makes the negative determination, the CPU advances the control to step S40.

In step S40, the CPU determines whether there is a possibility that the vehicle departs from the lane in a manner known in the art, based on the relative positional relationship of the vehicle 50 with respect to the lane detected by the camera sensor 12. When the CPU makes the negative determination, the CPU temporarily ends the control, and when the CPU makes the affirmative determination, the CPU advances the control to step S50.

In this case, the determination as to whether there is a possibility that the vehicle 50 departs from the lane may be performed, for example, as follows. First, as shown in FIG. 7, an angle $\theta y$ formed by a traveling direction 62 of the vehicle with respect to a longitudinal direction 60 of the lane 54 is estimated based on the image information ahead of the vehicle 50. The angle $\theta y$ is a positive value when the traveling direction 62 of the vehicle 50 is on a left side with respect to the longitudinal direction 60 of the lane 54. A lateral speed Vy of the vehicle 50 in a direction perpendicular to the longitudinal direction 60 of the lane 54 is estimated as $V \sin \theta y$ based on the angle $\theta y$ and the vehicle speed V.

Further, a distance Dy (not shown) in the lane width direction between the white line 56L (first lane boundary) on the side where the vehicle 50 approaches and the center of gravity of the vehicle is estimated. Further, it may be determined that there is a possibility that the vehicle 50 departs from the lane when $Dy-Vy\Delta t$ is equal to or less than a preset reference value Dyc (positive constant), with $\Delta t$ serving as a preset time.

In step S50, the CPU determines whether the driver intends to depart from the lane. When the CPU makes a negative determination, the CPU advances the control to step S60, and when the CPU makes an affirmative determination, the CPU sets the flag Foff to 1 so that the lane departure suppression control is not executed in step S55, and then temporarily terminates the control.

In this case, the CPU determines that the driver intends to depart from the lane beyond the lane boundary, when a turn signal lever not shown in FIG. 1 is in an operating position or when the driver is performing a steering operation to change the lane. The steering operation may be determined by whether a magnitude of the steering torque Ts detected by the torque sensor 32 is equal to or greater than a reference value Tsc or a magnitude of a steering angle $\theta$ that is a rotation angle of the steering shaft 30 is equal to or greater than a reference value $\theta sc$.

A steering resistance when the steering wheel 24 is steered by the steering operation of the driver becomes smaller as the vehicle speed V is higher. Thus, the reference value Tsc may be a positive constant, but is variably set in accordance with the vehicle speed so that the higher the vehicle speed V, the smaller the reference value Tsc. Therefore, as compared with the case where the reference value Tsc is a constant, it is possible to appropriately determine whether the driver intends to depart from the lane beyond the lane boundary, regardless of the vehicle speed.

In step S60, the CPU executes the lane departure suppression control. That is, by activating the warning device 18, the CPU issues a warning that there is a possibility that the vehicle 50 departs from the lane. Further, the CPU automatically steers the steering wheel 24 with the EPS device 22 so that the vehicle 50 does not depart from the lane by outputting a command signal of automatic steering to the EPS/ECU 20.

In step S70, the CPU determines whether a return condition of the lane departure suppression control is satisfied. When the CPU makes an affirmative determination, the CPU advances the control to step S85, and when the CPU makes a negative determination, the CPU advances the control to step S80.

In this case, the CPU determines that the control return condition is satisfied at the earlier one of time points A and B described below. In the determination at the time point B, in addition to the fact that the vehicle 50 has completed the lane change beyond the lane boundary, the lateral speed and the lateral acceleration of the vehicle with respect to the adjacent lane may be determined to be equal to or less than a reference lateral speed and a reference lateral acceleration, respectively.

Time point A: When it is determined that a time equal to or more than a reference time Tc has elapsed from the time point at which the determination in step S50 changes from the negative determination to the affirmative determination, that is, the time point at which the driver's intention to depart from the lane changes from "No" to "Yes"

Time point B: When it is determined that the vehicle 50 has crossed the lane boundary and the lane change is completed, that is, when it is determined that the entire vehicle 50 has moved to the lane that is the lane changing destination, based on the relative positional relationship between the vehicle 50 and the white line In step S80, the CPU determines whether the driver has canceled the intention of lane departure. When the CPU makes the negative determination, the CPU temporarily terminates the control, and when the CPU makes the affirmative determination, the CPU resets the flag Foff to 0 so that the lane departure suppression control returns, in step S85, and then temporarily terminates the control. The CPU determines that the driver has canceled the intention of lane departure when the driver returns the turn signal lever to the non-operating position (neutral position) or when the driver performs a steering operation to cancel the lane change.

Control Routine of not Executing Lane Departure Suppression Control when Driving in Merging Area Next, the control routine of not executing the lane departure suppression control when the vehicle 50 travels in the merging area of the road will be described with reference to the flowchart shown in FIG. 3. The control according to the flowchart shown in FIG. 3 and the control according to the flowchart shown in FIG. 4 described below are repeatedly executed by the CPU of the LDA/ECU 10 at a predetermined control cycle when the LDA switch 16 shown in FIG. 1 is turned on. In the following description, the control routine of not executing the lane departure suppression control when the vehicle 50 travels in the merging area of the road is simply referred to as a "control in the merging area".

First, in step S110, the CPU determines whether the flag Fma is 1, that is, determines whether the lane departure suppression control when the vehicle 50 travels in the merging area of the road is not executed. When the CPU makes the affirmative determination, the CPU advances the control in the merging area to step S180, and when the CPU makes the negative determination, the CPU advances the control in the merging area to step S120.

In step S120, the CPU determines whether the flag Fmb is 1, that is, determines whether it has already been determined that the acceleration operation by the driver has been performed in step S130 described later. When the CPU makes the affirmative determination, the CPU advances the control in the merging area to step S150, and when the CPU makes the negative determination, the CPU advances the control in the merging area to step S130.

The flags Fma and Fmb are initialized to 0 at the start of the control in the merging area, and then set to 0 or 1 in accordance with the flowchart shown in FIG. 3 as described later.

In step S130, the CPU determines whether the acceleration operation by the driver has been performed within the acceleration determination time up to the present, based on the history of the accelerator operation amount Acc detected by the accelerator operation amount sensor 42. When the CPU makes a negative determination, the CPU advances control to step S150, and when the CPU makes an affirmative determination, the flag Fmb is set to 1 in step S140.

When the accelerator operation amount Acc has exceeded a reference value Accm (positive constant), it may be determined that the acceleration operation has been performed by the driver. Further, although the acceleration determination time may be a positive constant, the acceleration determination time may be variably set according to the vehicle speed V so that the higher the vehicle speed V, the smaller the acceleration determination time.

Further, the determination of whether the acceleration operation is performed by the driver may be determined by whether a front-rear acceleration Gx or a differential value (acceleration) Vd of a vehicle speed V of the vehicle detected by the front-rear acceleration sensor (not shown in the figure) is equal to or more than the acceleration reference value (positive constant). The front-rear acceleration Gx and the differential value Vd are positive values when the front-rear acceleration Gx and the differential value Vd are acceleration, and negative values when the front-rear acceleration Gx and the differential value Vd are deceleration.

Figure 5:
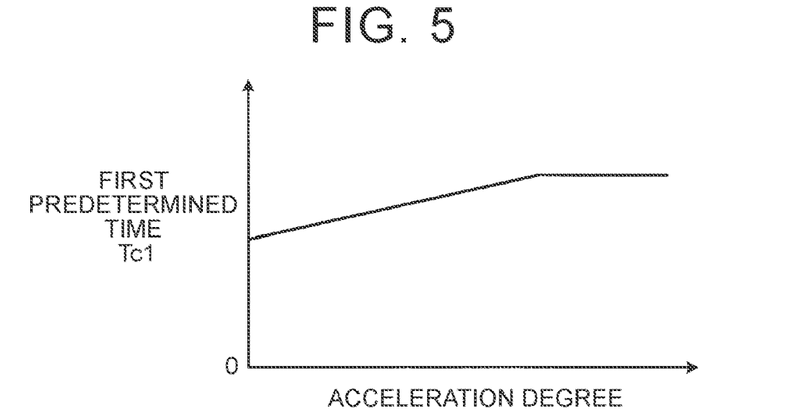
FIG. 5 is a map for calculating a first predetermined time Tc1 based on an acceleration degree of the vehicle.

In step S150, the CPU calculates a first predetermined time Tc1 by referring to the map shown in FIG. 5 based on the acceleration degree, in which a maximum value Accmax of the accelerator operation amount Acc up to the present serving as the acceleration degree of the vehicle 50. As shown in FIG. 5, the first predetermined time Tc1 is calculated so as to increase as the acceleration degree increases.

Further, the CPU determines whether the vehicle 50 is behaving a manner so as to depart from the lane, within the first predetermined time Tc1 from the time point when it is determined in step S130 that the acceleration operation by the driver is started. When the CPU makes the negative determination, the CPU temporarily ends the control in the merging area, and when the CPU makes the affirmative determination, the CPU advances the control in the merging area to step S160.

The determination of whether the vehicle 50 is behaving in a manner so as to depart from the lane may be determined by whether an absolute value of the lateral speed Vy of the vehicle 50 is equal to or more than a reference value Vym (positive constant) and an absolute value of the differential value (lateral acceleration) Vyd of the lateral speed Vy is equal to or more than a reference value Vydm (positive constant). Further, the speed and the lateral acceleration used for determining whether the vehicle 50 is behaving in a manner so as to depart from the lane may be calculated based on a lateral acceleration Gy of the vehicle detected by the lateral acceleration sensor (not shown in FIG. 1).

In step S160, the CPU determines whether an adjacent lane exists on the side of the vehicle 50 in the direction of the lateral speed Vy and the differential value Vyd, and whether the width of the lane in which the vehicle 50 is currently traveling is reduced. When the CPU makes a negative determination, the CPU temporarily terminates the control in the merging area, and when the CPU makes the affirmative determination, the CPU sets the flag Fma to 1 in step S170.

In step S180, the CPU determines whether the vehicle 50 has moved to the adjacent lane as a determination as to whether the preset cancel condition is satisfied. When the CPU makes the negative determination, the CPU temporarily ends the control in the merging area, and when the CPU makes the affirmative determination, the CPU resets the flag Fma to 0 in step S190.

When it is determined that more than half of the vehicle 50 has moved to the adjacent lane, or when it is determined that the reference position such as the center of gravity of the vehicle 50 has crossed the boundary line between the current lane and the adjacent lane, it may be determined that the vehicle 50 has moved to the adjacent lane.

Control Routine of not Executing Lane Departure Suppression Control when Driving in a Branch Area Next, the control routine of not executing the lane departure suppression control when the vehicle 50 travels in the branch area of the road will be described with reference to the flowchart shown in FIG. 4. In the following description, the control routine of not executing the lane departure suppression control when the vehicle 50 travels in the branch area of the road is simply referred to as a "control in the branch area".

First, in step S210, the CPU determines whether the flag Fba is 1, that is, determines whether the lane departure suppression control when the vehicle 50 travels in the branching area of the road is not executed. When the CPU makes the affirmative determination, the CPU advances the control in the branch area to step S280, and when the CPU makes the negative determination, the CPU advances the control in the branch area to step S220.

In step S220, the CPU determines whether the flag Fbb is 1, that is, determines whether it has already been determined that the deceleration operation by the driver has been performed in step S230 described below. When the CPU makes the affirmative determination, the CPU advances the control in the branch area to step S250, and when the CPU makes the negative determination, the CPU advances the control in the branch area to step S230.

The flags Fba and Fbb are initialized to 0 at the start of control, and then set to 0 or 1 according to the flowchart shown in FIG. 4 as described later.

In step S230, the CPU determines whether the deceleration operation by the driver has been performed within a deceleration determination time up to the present, based on a history of the master cylinder pressure Pm detected by the pressure sensor 44. When the CPU makes a negative determination, the CPU advances the control in the branch area to step S250, and when the CPU makes an affirmative determination, the flag Fbb is set to 1 in step S240.

When the master cylinder pressure Pm has exceeded a reference value Pmb (positive constant), it may be determined that the deceleration operation by the driver has been performed. Further, although the deceleration determination time may be a positive constant, the acceleration determination time may be variably set according to the vehicle speed V so that the higher the vehicle speed V, the smaller the acceleration determination time.

Further, the determination of whether the deceleration operation is performed by the driver may be determined by whether the front-rear acceleration Gx detected by the front-rear acceleration sensor (not shown in the figure) or the differential value (acceleration) Vd of the vehicle speed V detected by the vehicle speed sensor 14 is equal to or less than the deceleration reference value (negative constant).

Figure 6:
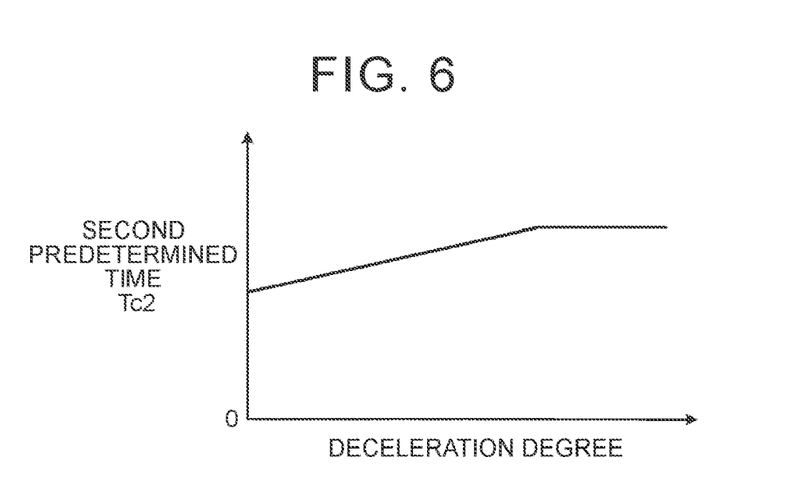
FIG. 6 is a map for calculating a second predetermined time Tc2 based on a deceleration degree of the vehicle.

In step S250, for example, with the maximum value Pmmax of the master cylinder pressure Pm up to the present serving as the deceleration degree of the vehicle 50, the CPU calculates a second predetermined time Tc2, by referring to the map shown in FIG. 6 based on the deceleration rate. As shown in FIG. 6, the second predetermined time Tc2 is calculated so as to increase as the deceleration degree increases.

Further, the CPU determines whether the vehicle 50 is behaving a manner so as to depart from the lane, within the second predetermined time Tc2 from the time point when it is determined in step S230 that the deceleration operation by the driver is started. When the CPU makes a negative determination, the CPU temporarily ends the control in the branch area, and when the CPU makes an affirmative determination, the CPU advances the control in the branch area to step S260.

The determination of whether the vehicle 50 is behaving in a manner so as to depart from the lane may be determined by whether an absolute value of the lateral speed Vy of the vehicle 50 is equal to or more than a reference value Vyb (positive constant) and an absolute value of the differential value (lateral acceleration) Vyd of the lateral speed Vy is equal to or more than a reference value Vydb (positive constant). Further, the lateral speed and the lateral acceleration used for determining whether the vehicle 50 is behaving in a manner so as to depart from the lane may be calculated based on a lateral acceleration Gy of the vehicle detected by the lateral acceleration sensor (not shown in FIG. 1).

In step S260, the CPU determines whether the adjacent lane exists on the side of the vehicle 50 in the direction of the lateral speed Vy and the differential value Vyd, and determines whether the width of the adjacent lane is increased. When the CPU makes a negative determination, the CPU temporarily terminates the control in the branching area, and when the CPU makes an affirmative determination, the CPU sets the flag Fba to 1 in step S270.

In step S280, the CPU determines whether the vehicle 50 has moved to the adjacent lane as a determination as to whether the preset cancel condition is satisfied. When the CPU makes a negative determination, the CPU temporarily ends the control in the branch area, and when the CPU makes an affirmative determination, the CPU resets the flag Fba to 0 in step S290.

Also in step S280, when it is determined that more than half of the vehicle 50 has moved to the adjacent lane or when it is determined that the reference position such as the center of gravity of the vehicle 50 has crossed the boundary line between the current lane and the adjacent lane, it may be determined that the vehicle 50 has finished moving to the adjacent lane.

Operation of the Embodiment

Next, the operation of the embodiment will be described for various cases.

C1. When Vehicle 50 Travels in Merging Area of Road

Figure 8:
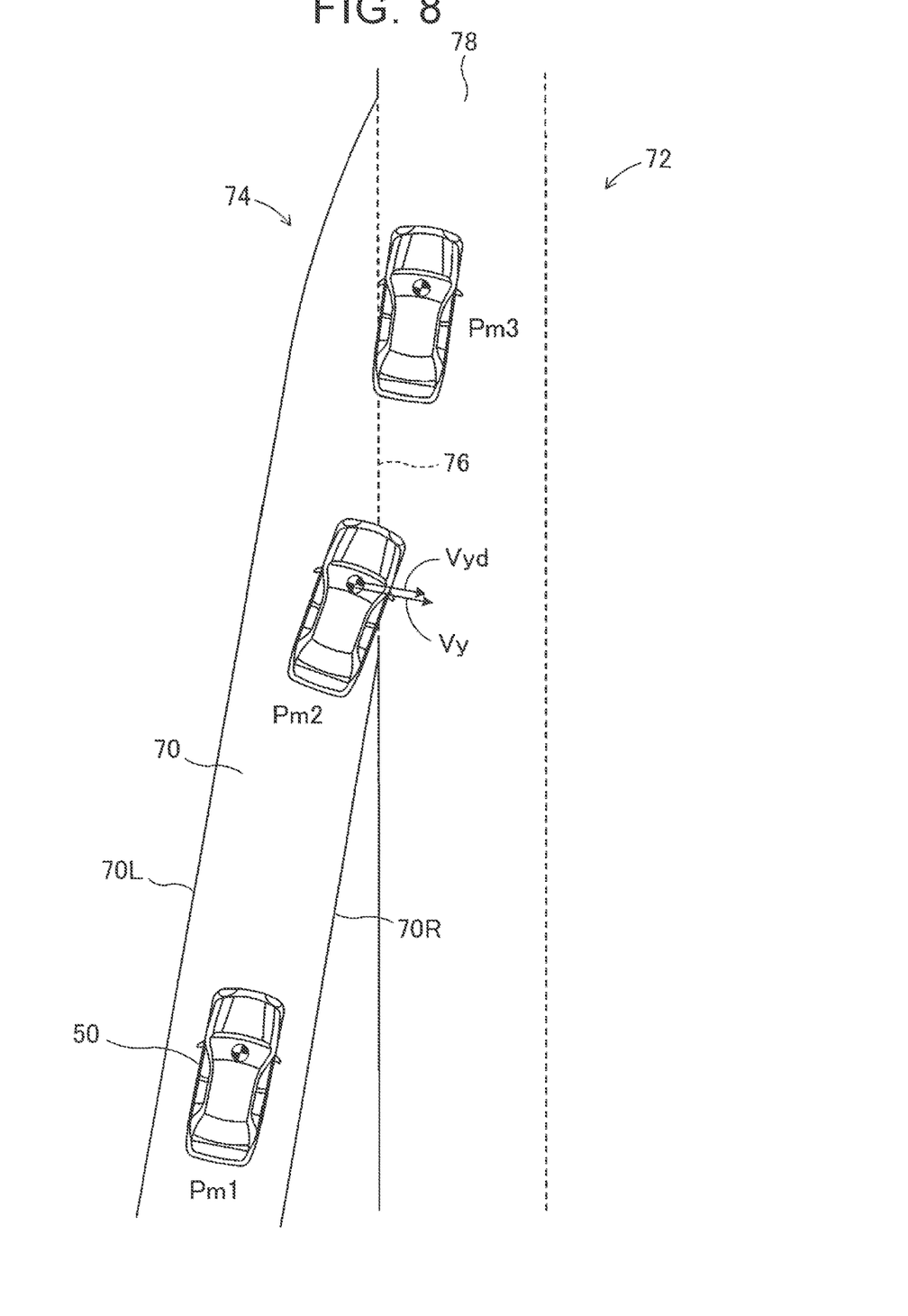
FIG. 8 is a diagram showing a situation in which the vehicle travels in the merging area where a branch road merges with a main road.

FIG. 8 shows a situation in which the vehicle 50 travels in a merging area 74 where a branch road 70 joins a main road 72.

First, since the acceleration operation is performed by the driver until the vehicle 50 approaches a boundary line 76 between the branch road 70 and the main road 72, an affirmative determination is made in step S130. However, when the vehicle 50 is at a position Pm1 that is far in front of the boundary line 76, an inclination angle of the vehicle 50 with respect to white lines 70L and 70R of the branch road 70 is small. Thus, a negative determination is made in step S150, and a negative determination is made in steps S10 to S40. Therefore, the lane departure suppression control, that is, the operation of the warning device 18 and automatic steering of the steering wheel 24 are not performed.

When the vehicle 50 approaches the boundary line 76 as in the position Pm2, the steering operation is performed so that the vehicle approaches the main road 72, the inclination angle of the vehicle 50 with respect to the white lines 70L and 70R increases, and the lateral speed Vy and the differential value Vyd increases to the right direction. An adjacent lane 78 exists on the right side on the side in the direction in which the lateral speed Vy and the differential value Vyd increase, and the width of the lane (branch road 70) in which the vehicle 50 is currently traveling decreases. Thus, an affirmative determination is made in steps S150 and S160, and the flag Fma is set to 1 in step S170.

The flag Fma is maintained at 1 until an affirmative determination is made in step S180, that is, until the vehicle 50 moves to the adjacent lane 78 as in a position Pm3. Thus, since an affirmative determination is made in step S20, the lane departure suppression control in step S60 is not executed. Therefore, since the automatic steering of the steering wheel 24 by the lane departure suppression control is not executed, the driver can move the vehicle 50 from the branch road 70 to the adjacent lane 78 of the main road 72 as desired.

C2. When Vehicle 50 Travels in Branch Area of Road

Figure 9:
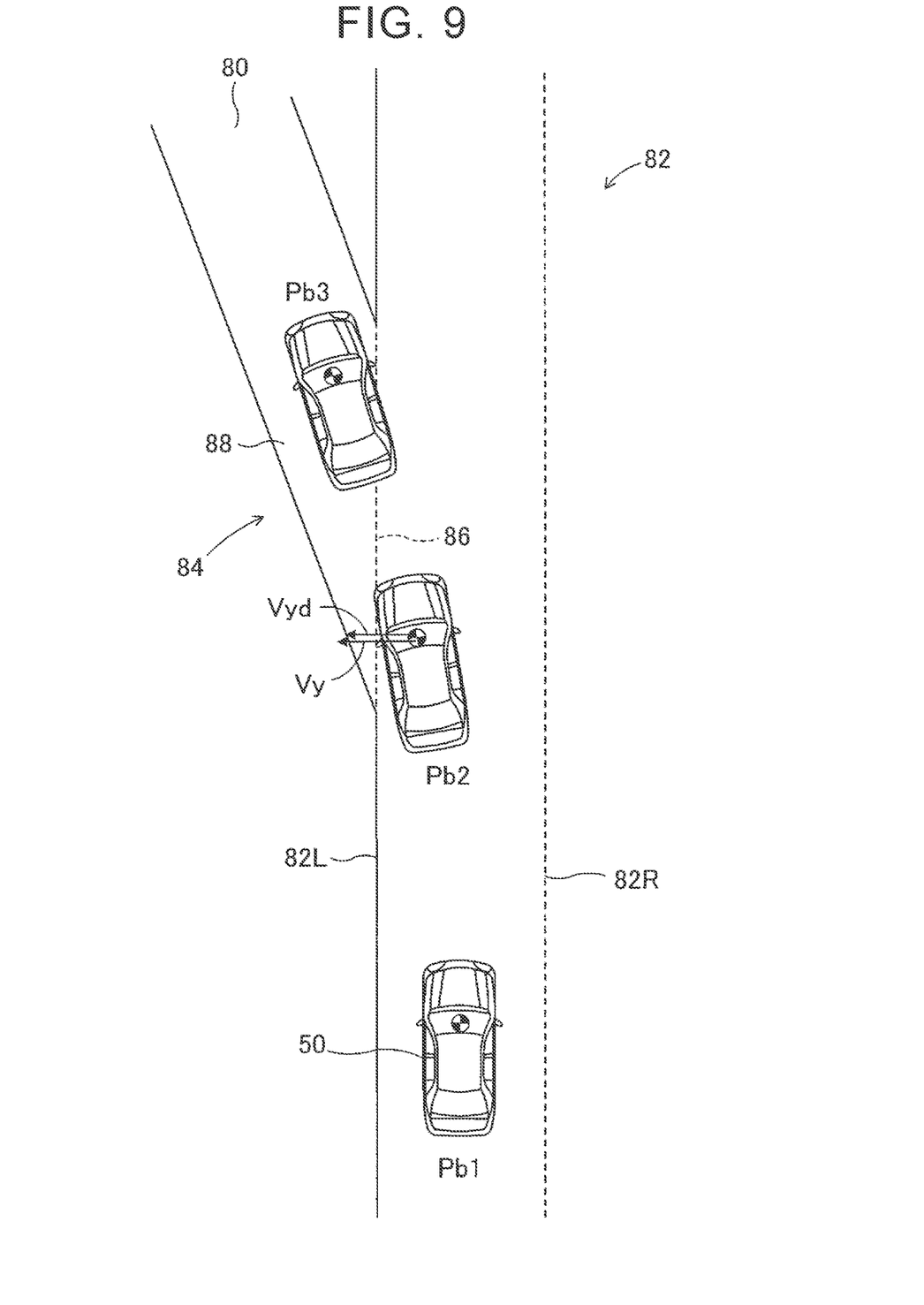
FIG. 9 is a diagram showing a situation in which the vehicle travels in the branch area where the branch road branches from the main road.

FIG. 9 shows a situation in which the vehicle 50 travels in a branch area 84 in which a branch road 80 branches from a main road 82.

First, since the deceleration operation is performed by the driver until the vehicle 50 approaches a boundary line 86 between the branch road 80 and the main road 82, an affirmative determination is made in step S230. However, when the vehicle 50 is located at a position Pb1 that is far in front of the boundary line 86, the inclination angle of the vehicle 50 with respect to white lines 82L and 82R of the main road 82 is small. Thus, a negative determination is made in step S250, and a negative determination is made in steps S10 to S40. Therefore, the lane departure suppression control, that is, the operation of the warning device 18 and automatic steering of the steering wheel 24 are not performed.

When the vehicle 50 approaches the boundary line 86 as in the position Pb2, the steering operation is performed so that the vehicle approaches the branch road 80, the inclination angle of the vehicle 50 with respect to the white lines 82L, 82R and the boundary line 86 increases, and the lateral speed Vy and the differential value Vyd of the vehicle increase to the left direction. An adjacent lane 88 exists on the left side on the side in the direction in which the lateral speed Vy and the differential value Vyd increase, and the width of the adjacent lane 88 increases. Thus, an affirmative determination is made in steps S250 and S260, and the flag Fba is set to 1 in step S270.

The flag Fba is maintained at 1 until an affirmative determination is made in step S280, that is, until the vehicle 50 moves to the adjacent lane 88 as in position Pb3. Thus, since an affirmative determination is made in step S30, the lane departure suppression control in step S60 is not executed. Therefore, since the automatic steering of the steering wheel 24 by the lane departure suppression control is not executed, the driver can move the vehicle 50 from the main road 82 to the branch road 80 as desired.

C3. When there is Risk that Vehicle 50 Will Depart from Lane Due to Carelessness of Driver Since the flags Fma and Fba are set to 0, a negative determination is made in steps S10 to S30, an affirmative determination is made in step S40, and a negative determination is made in step S50. Thus, since the lane departure suppression control is executed in step S60, it is possible to suppress the vehicle 50 from deviating from the lane by operating the warning device 18 and automatically steering the steering wheel 24.

C4. When Vehicle 50 Departs from Lane by Intension of Driver

Since the flags Fma and Fba are set to 0, a negative determination is made in steps S10 to S30, an affirmative determination is made in steps S40 and S50, and the flag Foff is set to 1 in step S55. The flag Foff is maintained at 1 until an affirmative determination is made in step S70 or S80. Thus, when the vehicle 50 departs from the lane due to the disclosure of the driver, since the lane departure suppression control is not executed, the driver can perform the lane departure such as changing lanes as desired.

As can be seen from the above description, according to the embodiment, when the vehicle 50 travels in the merging area 74 of the road and when the vehicle travels in the branch area 84 of the road, since the lane departure prevention control is not executed, it is possible to suppress the driver from feeling annoyed by the automatic steering of the steering wheel and by an alarm being issued.

Further, according to the embodiment, when it is determined that the situation is such that the vehicle 50 is traveling in the merging area 74 or the branching area 84 of the road (steps S20 and S30), determination of whether there is a possibility that the vehicle departs from the lane is not performed (step S40). Thus, in a situation where the vehicle travels in the merging area or the branch area of the road and the lane departure suppression control is not executed, it is possible to suppress unnecessarily determining whether there is a possibility that the vehicle departs from the lane.

Further, according to the embodiment, when it is determined the situation is such that the vehicle 50 is traveling in the merging area 74 or the branching area 84 of the road, the lane departure suppression control is not executed until it is determined that the preset cancel condition is satisfied (steps S180 and S280). Thus, it is possible to suppress the lane departure suppression control from being executed unnecessarily early.

Further, according to one aspect of the embodiment, when the vehicle 50 moves to the adjacent lane and it is determined that the lateral speed and the lateral acceleration of the vehicle with respect to the adjacent lane are equal to or less than the reference lateral speed and the reference lateral acceleration, respectively, it is determined that the cancel condition is satisfied (steps S180 and S280). Thus, when the vehicle travels in the merging area 74 of the road, the lane departure suppression control can be suppressed from being executed until the vehicle moves from the branch road 70 to the main road 72 and substantially travels along the lane 78 of the main road. Further, when the vehicle travels in the branch area 84 of the road, the lane departure suppression control can be suppressed from being executed until the vehicle moves from the main road 82 to the branch road 80 and substantially travels along the lane 88 of the branch road.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, as the lane departure suppression control, a warning is issued by the operation of the warning device 18 and the steering wheel 24 is automatically steered by the EPS device 22. However, either a warning being issued or the automatic steering of the steering wheel 24 may be omitted.

Figure 2:
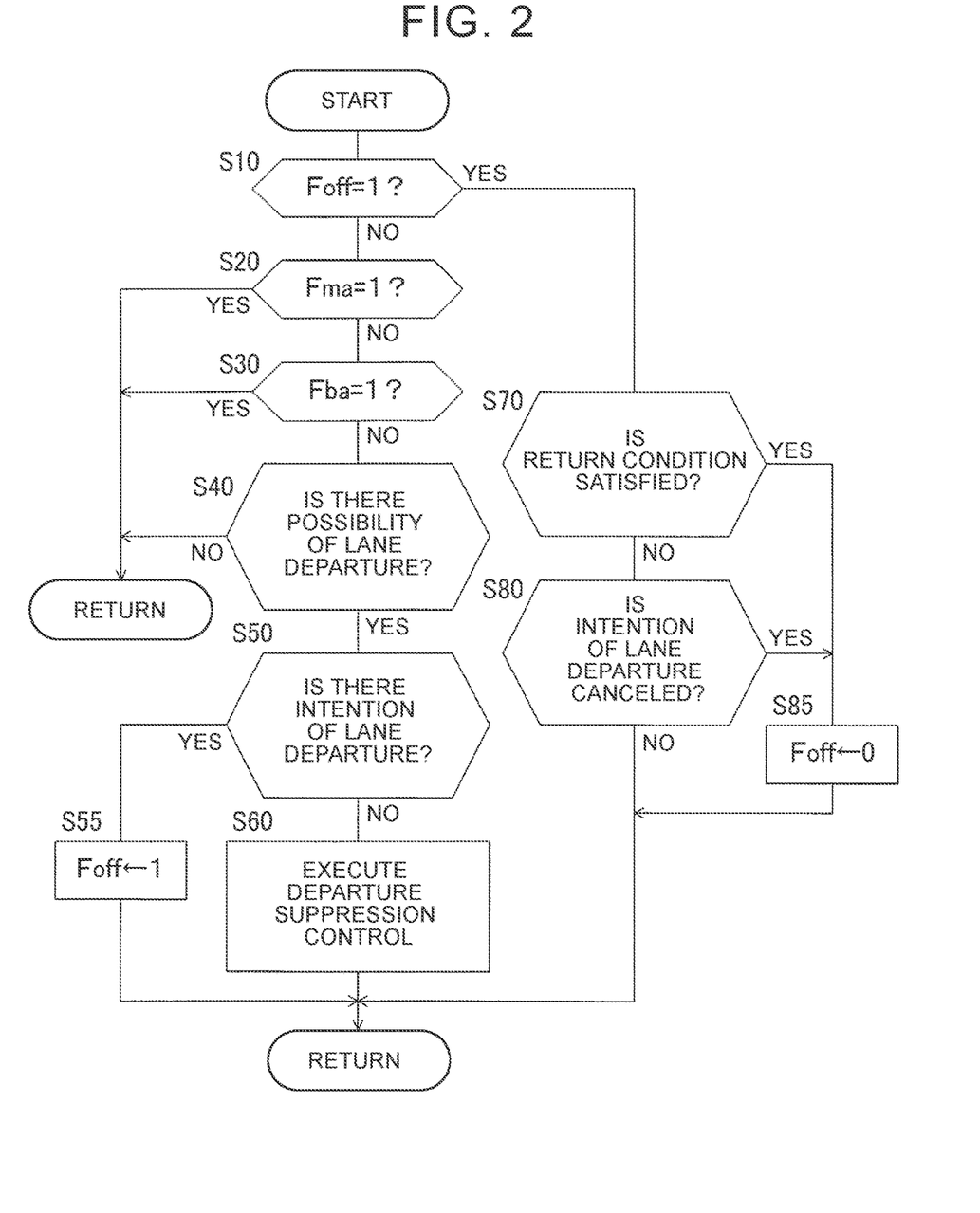
FIG. 2 is a flowchart showing a lane departure suppression control routine according to the embodiment.
Figure 3:
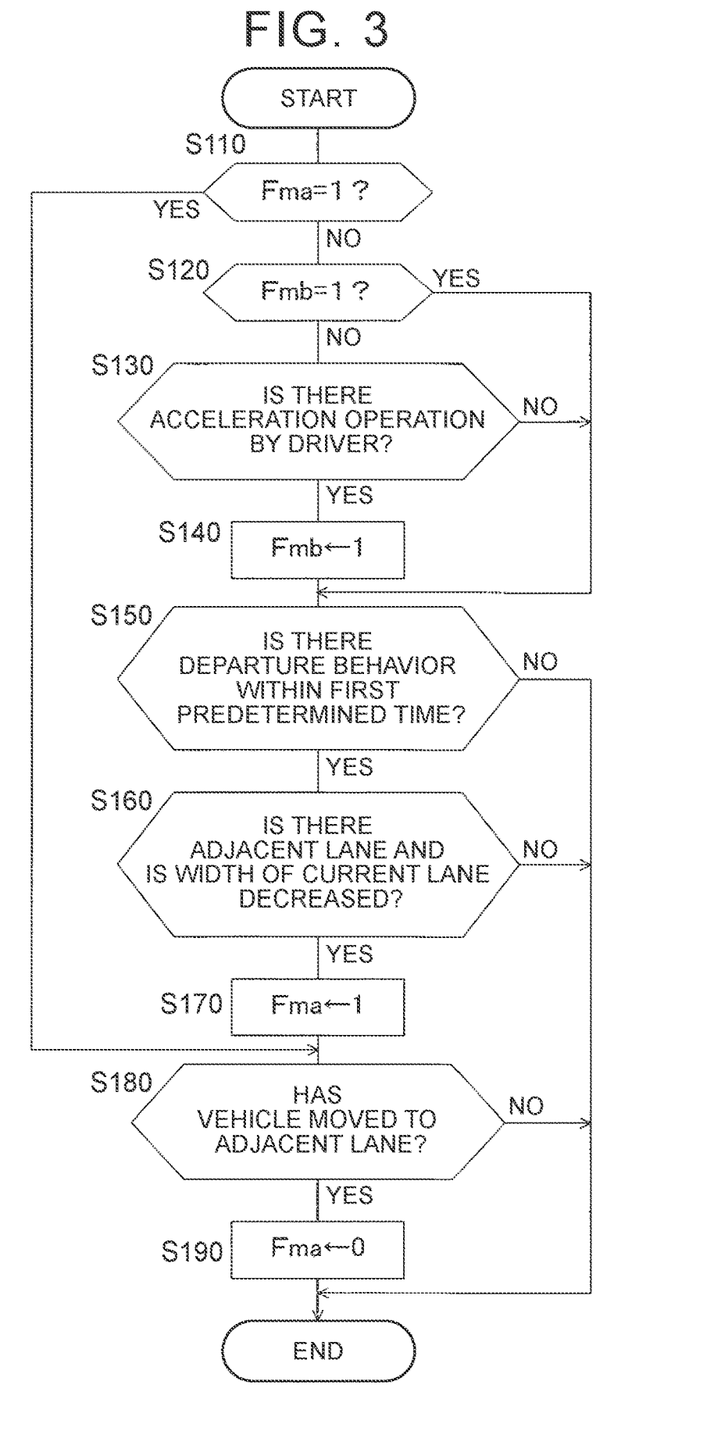
FIG. 3 is a flowchart showing a subroutine of a control of not executing of a lane departure suppression control when a vehicle travels in a merging area of a road.
Figure 4:
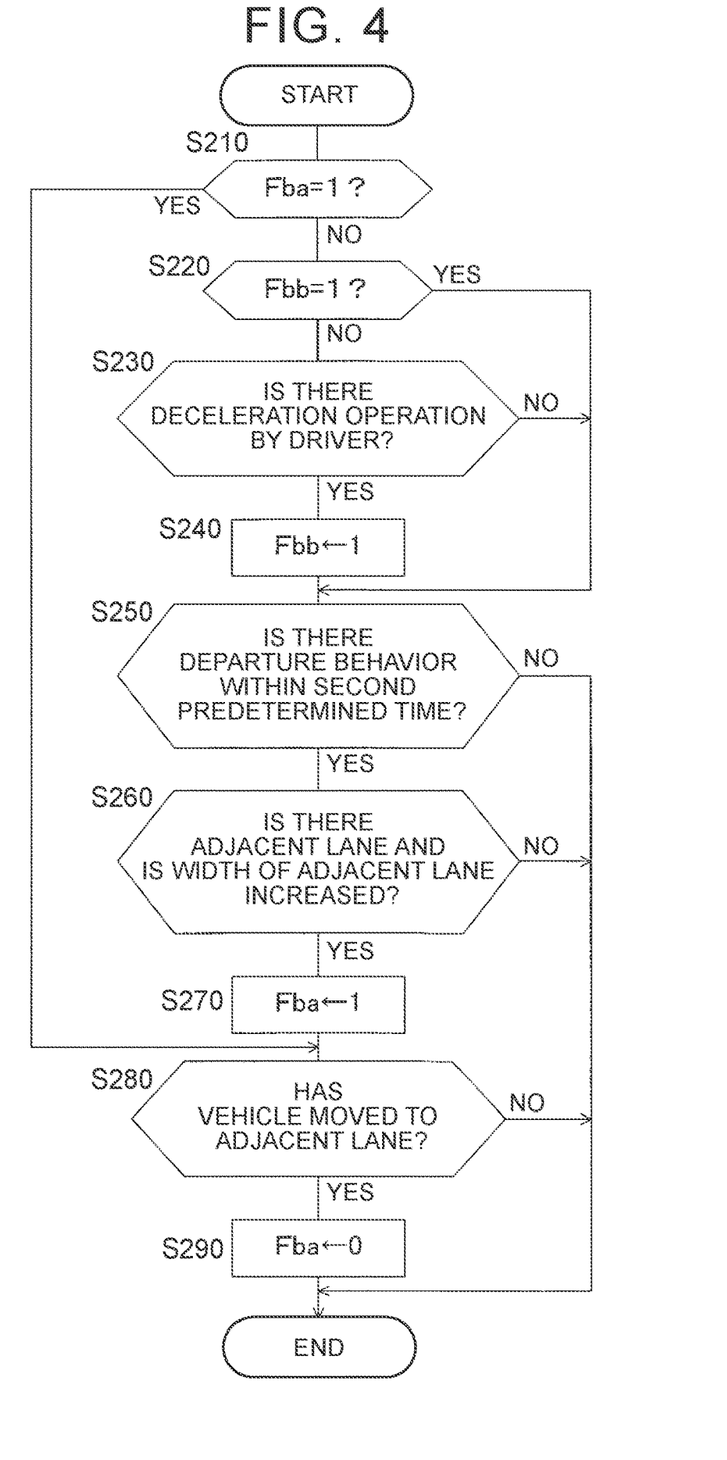
FIG. 4 is a flowchart showing the subroutine of the control of not executing of the lane departure suppression control when the vehicle travels in a branching area of the road.

Further, in the above-described embodiment, the control of not executing the lane departure suppression control when the vehicle 50 travels in the merging area and the branching area of the road is executed as a routine separate from the lane departure suppression control routine according to the flowchart shown in FIG. 2, following the flowcharts shown in FIGS. 3 and 4, respectively. However, the control routine of not executing the lane departure suppression control when the vehicle 50 travels in the merging area and the branching area of the road may be executed as a part of the lane departure suppression control routine according to the flowchart shown in FIG. 2.

Figure 10:
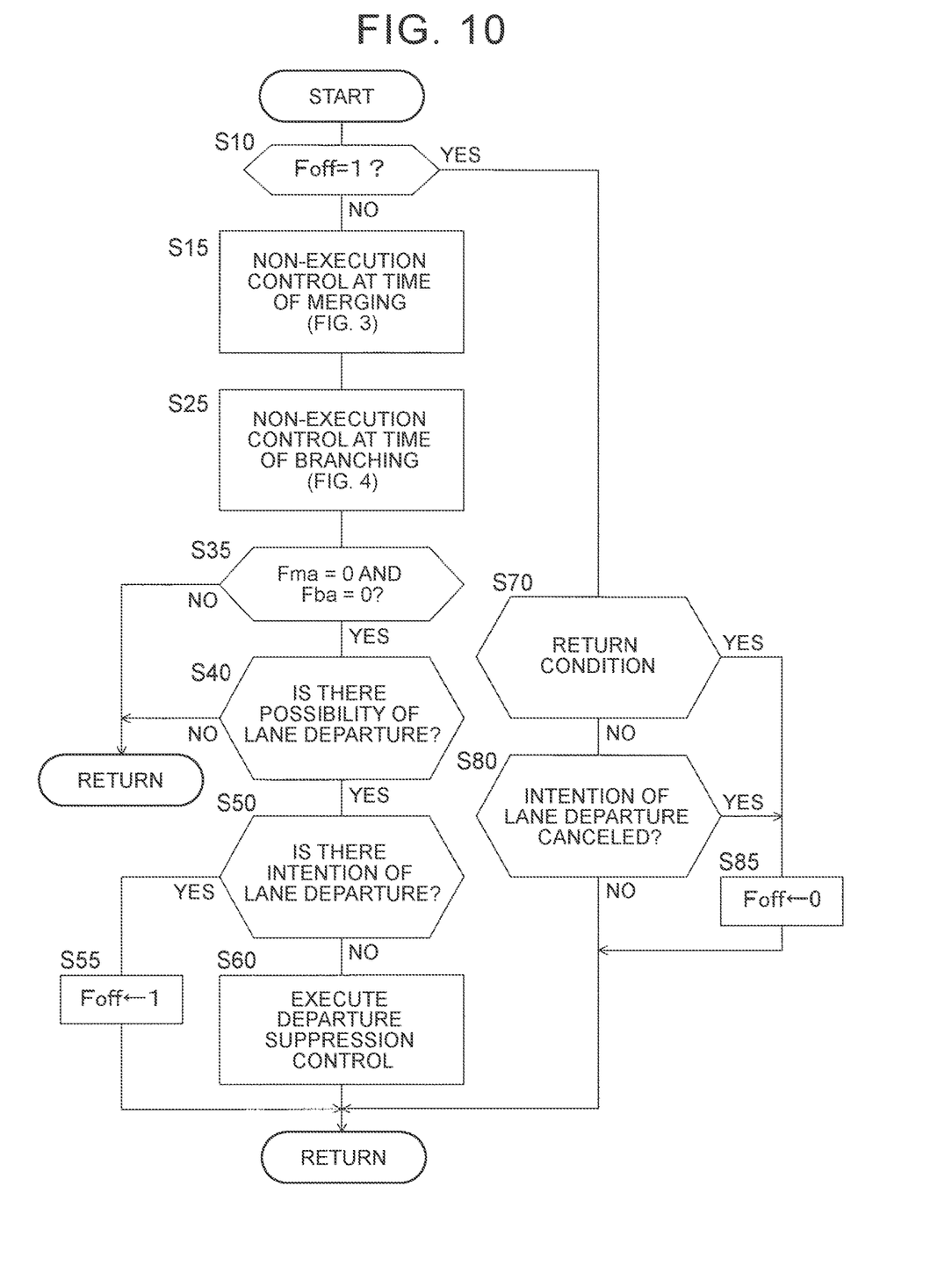
FIG. 10 is a flowchart showing the lane departure suppression control routine in a modified example.

For example, as shown in FIG. 10 as a modified example, in step S15 that is executed after step S10, steps S110 to 190 shown in FIG. 3 may be executed, and in step S25, steps S210 to 290 shown in FIG. 4 may be executed. Further, in step S35, the control may be temporarily terminated when it is determined that one of the flags Fma and Fba is 1, and the control may proceed to step S40 when it is determined that the flags Fma and Fba are 0.

What is claimed is:

1. A lane departure suppression device comprising:
a vehicle position detection device that detects a position of a vehicle with respect to a lane; and
an electronic control unit configured to:
execute a lane departure suppression control that includes automatically steering a steering wheel and/or issuing a warning based on the position of the vehicle detected by the vehicle position detection device,
determine that a driver intends to maintain the lane when a turn signal lever is not in an operating position and the driver is performing a steering operation to maintain the lane, the steering operation being determined by whether a magnitude of a steering torque is less than a first predetermined value or a magnitude of a steering angle is less than a second predetermined value,
determine that the driver intends to depart from the lane beyond a lane boundary when the turn signal lever is in the operating position or the driver is performing the steering operation to change the lane, the steering operation being determined by whether the magnitude of the steering torque is equal to or greater than the first predetermined value or the magnitude of the steering angle is equal to or greater than the second predetermined value, and
based upon the determination that the driver intends to depart from the lane beyond the lane boundary, cancel the lane departure suppression control.

2. The lane departure suppression device according to claim 1, wherein, after the lane departure suppression control is cancelled, the electronic control unit is configured to continue to cancel the lane departure suppression control until the electronic control unit determines that a preset cancel condition is satisfied.

3. The lane departure suppression device according to claim 2, wherein the electronic control unit is configured to determine that the preset cancel condition is satisfied when the electronic control unit determines that the vehicle has moved to the adjacent lane and determines that the lateral speed and the lateral acceleration of the vehicle with respect to the adjacent lane are equal to or less than a reference lateral speed and a reference lateral acceleration, respectively.

* * * * *